US007458018B2

(12) United States Patent
Jones et al.

(10) Patent No.: US 7,458,018 B2
(45) Date of Patent: Nov. 25, 2008

(54) SYSTEM AND METHOD FOR OBTAINING AND USING NAMESPACE RELATED INFORMATION FOR OPENING XML DOCUMENTS

(75) Inventors: Brian Michael Jones, Redmond, WA (US); Marcin Sawicki, Kirkland, WA (US); Robert Andrew Little, Redmond, WA (US); Daniel Robert Snyder, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 271 days.

(21) Appl. No.: 10/185,940

(22) Filed: Jun. 27, 2002

(65) Prior Publication Data

US 2004/0205470 A1    Oct. 14, 2004

(51) Int. Cl.
*G06F 17/21* (2006.01)
*G06F 17/30* (2006.01)

(52) U.S. Cl. .............. 715/234; 715/236; 715/239; 715/248; 707/3

(58) Field of Classification Search ............ 715/526, 715/513, 523, 522, 234, 236, 239, 248, 255, 715/249; 707/205, 1, 3
See application file for complete search history.

(56) References Cited

U.S. PATENT DOCUMENTS

| | | | |
|---|---|---|---|
| 5,748,191 A * | 5/1998 | Rozak et al. ............... 715/728 |
| 5,963,939 A * | 10/1999 | McCann et al. ............... 707/4 |
| 5,991,777 A | 11/1999 | Momoh et al. ............... 707/205 |
| 6,061,743 A * | 5/2000 | Thatcher et al. ............... 719/328 |
| 6,083,282 A | 7/2000 | Caron et al. ............... 717/6 |
| 6,317,749 B1 * | 11/2001 | Ghatate ............... 707/103 R |
| 6,611,847 B1 * | 8/2003 | Fontana et al. ............... 707/201 |
| 6,675,353 B1 * | 1/2004 | Friedman ............... 715/239 |
| 6,886,004 B2 * | 4/2005 | Molnar ............... 707/1 |
| 6,925,470 B1 * | 8/2005 | Sangudi et al. ............... 707/102 |
| 7,178,102 B1 * | 2/2007 | Jones et al. ............... 715/235 |
| 7,356,764 B2 * | 4/2008 | Radja et al. ............... 715/234 |
| 7,392,479 B2 * | 6/2008 | Jones et al. ............... 715/234 |
| 7,404,195 B1 * | 7/2008 | Sawicki et al. ............... 719/328 |
| 2001/0025247 A1 * | 9/2001 | Nagai et al. ............... 705/7 |
| 2002/0007375 A1 * | 1/2002 | Ebata ............... 707/513 |
| 2002/0065852 A1 * | 5/2002 | Hendrickson et al. ............... 707/517 |
| 2002/0069157 A1 * | 6/2002 | Jordan ............... 705/37 |
| 2002/0069400 A1 * | 6/2002 | Miloushev et al. ............... 717/108 |
| 2003/0014397 A1 * | 1/2003 | Chau et al. ............... 707/3 |
| 2003/0046316 A1 * | 3/2003 | Gergic et al. ............... 707/513 |
| 2003/0061202 A1 * | 3/2003 | Coleman ............... 707/3 |
| 2003/0149934 A1 * | 8/2003 | Worden ............... 715/513 |
| 2003/0167229 A1 * | 9/2003 | Ludwig et al. ............... 705/40 |
| 2003/0172196 A1 * | 9/2003 | Hejlsberg et al. ............... 709/328 |

(Continued)

OTHER PUBLICATIONS

Namespaces in XML, Jan. 14, 1999, World Wide Web Consortium, <http://www.w3.org/TR/REC-xml-names/>, p. 2.*

*Primary Examiner*—Adam L Basehoar
(74) *Attorney, Agent, or Firm*—Merchant & Gould; Ryan T. Grace (57) ABSTRACT

A system and method for obtaining and using namespace related information for presenting XML content. A namespace responsive application program determines one or more namespaces contained in an XML document and queries a namespace library to identify namespace related information, such as a solution related to the namespace. The identified namespace related information is retrieved and used for opening the XML document.

13 Claims, 5 Drawing Sheets

U.S. PATENT DOCUMENTS

2004/0006741 A1 * 1/2004 Radja et al. .................. 715/513
2004/0025117 A1 * 2/2004 Ingersoll et al. ............. 715/523
2004/0205496 A1 * 10/2004 Dutta et al. ............... 715/501.1
2006/0150095 A1 * 7/2006 Ingersoll et al. ............. 715/523

* cited by examiner

SYSTEM AND METHOD FOR OBTAINING AND USING NAMESPACE RELATED INFORMATION FOR OPENING XML DOCUMENTS

BACKGROUND OF THE INVENTION

Extensible Markup Language (XML) has attained wide popularity in recent years. XML is a universal language that provides a way to identify, exchange, and process various kinds of data. For example, XML is used to create documents that can be utilized by a variety of application programs of different manufacture.

An XML document is usually identified by a namespace, which may be used to identify what type of XML document it is. An application program may use the namespace to decide how to handle the document. In order to open the XML document and present the content of the document in a meaningful way, the application program must decide how the XML elements should be mapped into the objects used by the application program. A conventional application program may open the XML document by applying a transform, which is used to convert the XML document into an XML document that is in the application program's own namespace. However, since the standard transform has to work with many XML documents, the transform would likely not incorporate a rich mapping to the structure of the application program. The plain looking document that results from applying this type of universal transform provides a poor user experience.

Alternatively, the conventional application program may prompt the user to provide an applicable transform, such as an Extensible Style Language (XSL) transform. In this case, the user would have to know which particular XSL transform is applicable to convert the XML document as well as the location of that XSL transform. While there is a greater chance that this chosen solution will give the user a much richer experience, these extra steps create delays and require undue effort by the user. Also, the steps would likely have to be repeated each time the application program encounters another XML document. Moreover, unsophisticated users may be confused when prompted for an XSL transform.

SUMMARY OF THE INVENTION

Briefly stated, this invention is directed toward a system and method for obtaining and using namespace related information for opening an XML document and presenting the information in a meaningful way. A namespace library contains namespace related information indexed by namespaces. An application program is configured to open XML documents where each of the XML documents may refer to one or more namespaces. When the application program is commanded to open an XML document, the application program is configured to query the namespace library to locate namespace related information associated with the namespace and to use the namespace related information for opening the XML document. In one aspect of the invention, the namespace related information includes a solution and the application program is configured to use the solution to open the XML document.

In another aspect of the invention, the invention is directed toward a computer-implemented method for opening an XML document. The method determines at least one namespace contained in the XML document and queries a namespace library using the namespace to identify namespace related information associated with the determined namespace. The identified namespace related information is retrieved. If the namespace related information includes at least one solution, the method applies the solution to open the XML document. Otherwise, the method applies a default solution to open the XML document.

DETAILED DESCRIPTION OF THE PREFERRED EMBODIMENT

Briefly stated, this invention is directed toward a system and method for obtaining and using namespace related information for presenting XML content. A namespace responsive application program determines one or more namespaces contained in an XML document and queries a namespace library to identify namespace related information, such as a solution related to the namespace. The namespace related information is retrieved and used for opening the XML document.

Figure 1:
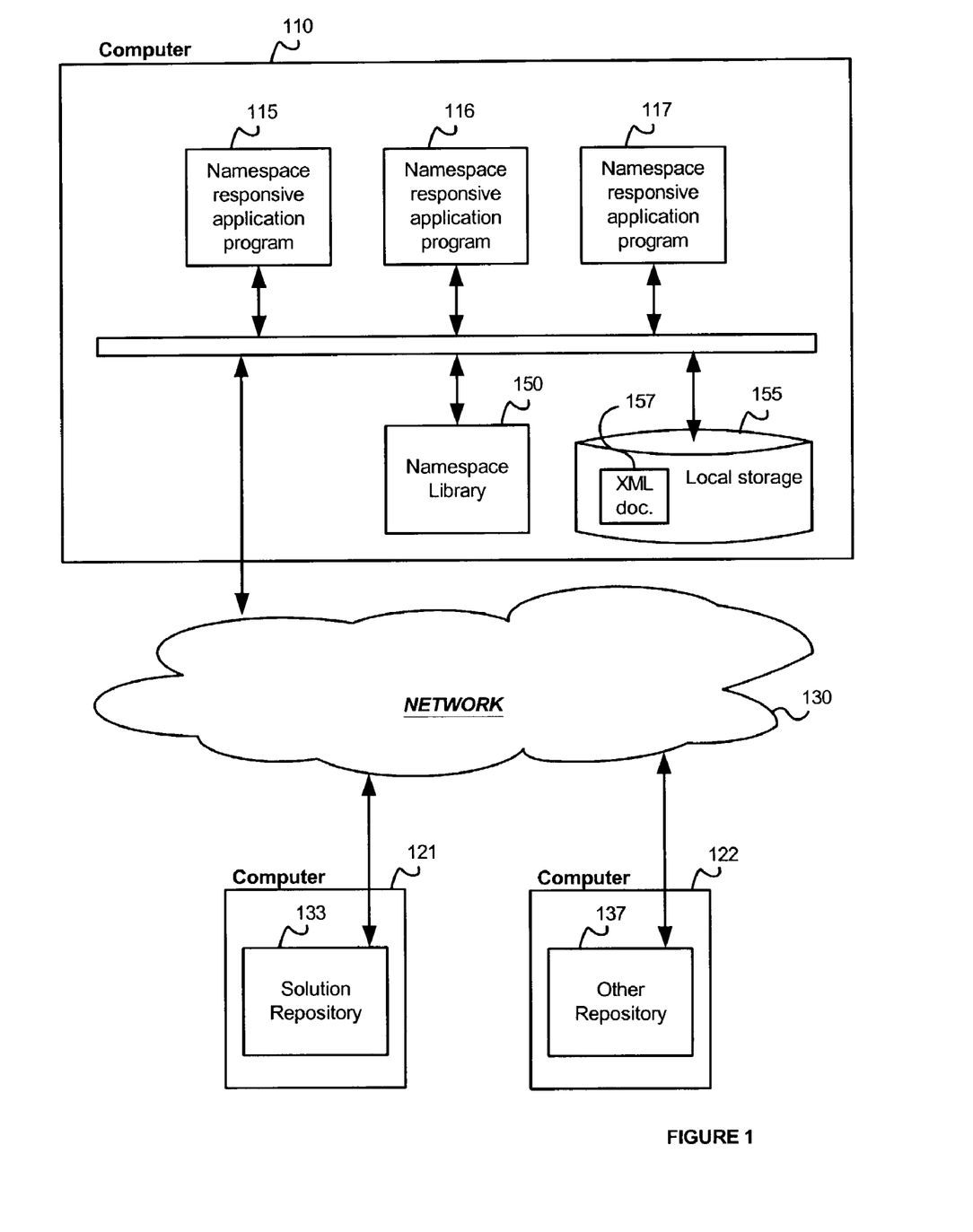
FIG. 1 shows an exemplary computing environment in which this invention may be implemented.

FIG. 1 and the following discussion are intended to provide a brief general description of a suitable computing environment in which the invention may be implemented. Although not required, this invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that this invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

FIG. 1 shows an exemplary computing environment in which this invention may be implemented. Computer 110 offers a computing environment in which the illustrative computer executable components for implementing one embodiment of the invention may operate. Central to this implementation are namespace responsive application programs 115-117 and namespace library 150. Computer 110 also allows namespace responsive application programs 115-117 and namespace library 150 to interact with other computers, such as remote computers 121 and 122, through a network 130.

Local storage 155 may include one or more permanent mass storage devices, such as hard disk drive, tape drive, optical drive, floppy disk drive, and the like. Local storage 155 provides a medium for storing data in computer 110. This data may include information used by namespace responsive application programs 115-117 and namespace library 150, such as the XML document 157, namespace related information, and the like. XML document 157 is a document containing content structured with XML markups. Network 130 may be any network capable of connecting computers. Examples of network 130 include a local area network (LAN) and a wide area network (WAN), such as the Internet.

Namespace library 150 is a component of computer 110 that makes namespace related information available to namespace responsive application programs 115-117. In namespace library 150, namespace related information is indexed by namespaces. Namespace related information is information related to creating, editing, viewing, and using XML documents. One type of namespace related information is solutions, which may include XML schemas, transforms, and the like. XML schemas define the structure, content and semantics of XML documents. The transforms may be used by namespace responsive application program 115-117 to convert XML documents to a format suitable for presentation. One such type of transforms is an Extensible Style Language (XSL) transform. It is to be understood that namespace library 150 may include location identifiers (such as a pointer) to solutions and other namespace related information. These location identifiers may be used by namespace responsive application programs 115-117 for retrieving the solutions and other namespace related information.

Remote computers 121 and 122 are connected to network 130 and are configured to interact with other computers over the network 130. One type of interaction is to provide information to the other computers. Accordingly, one of the functions performed by remote computers 121 and 122 is to serve as a repository of information. As shown in the figure, remote computers 121 and 122 may include solution repository 133, and other repository 137, respectively. Solution repository 133 is a collection of solution, which may include XML schemas, XSL transforms, standard or non-standard business rules, displaying information, editing permissions, aliases, and the like. Each of the solutions are identified by a particular namespace. Other repository 137 is a collection of other information related to namespaces. In the figure, solution repository 133 and other repository 137 are each stored in a separate computer. It is to be appreciated that multiple types of repositories may be stored on the same computer, or in any other combination of computers.

Namespace responsive application programs 115-117 are application programs that are configured to open XML documents, such as XML document 157. Namespace responsive application programs will be discussed in greater detail in conjunction with FIG. 2. Briefly stated, when a user commands a namespace responsive application program to open an XML document, the namespace responsive application program may query namespace library 150 to obtain namespace related information that are applicable to the XML document. The namespace responsive application program then opens the XML document using the namespace related information.

Figure 2:
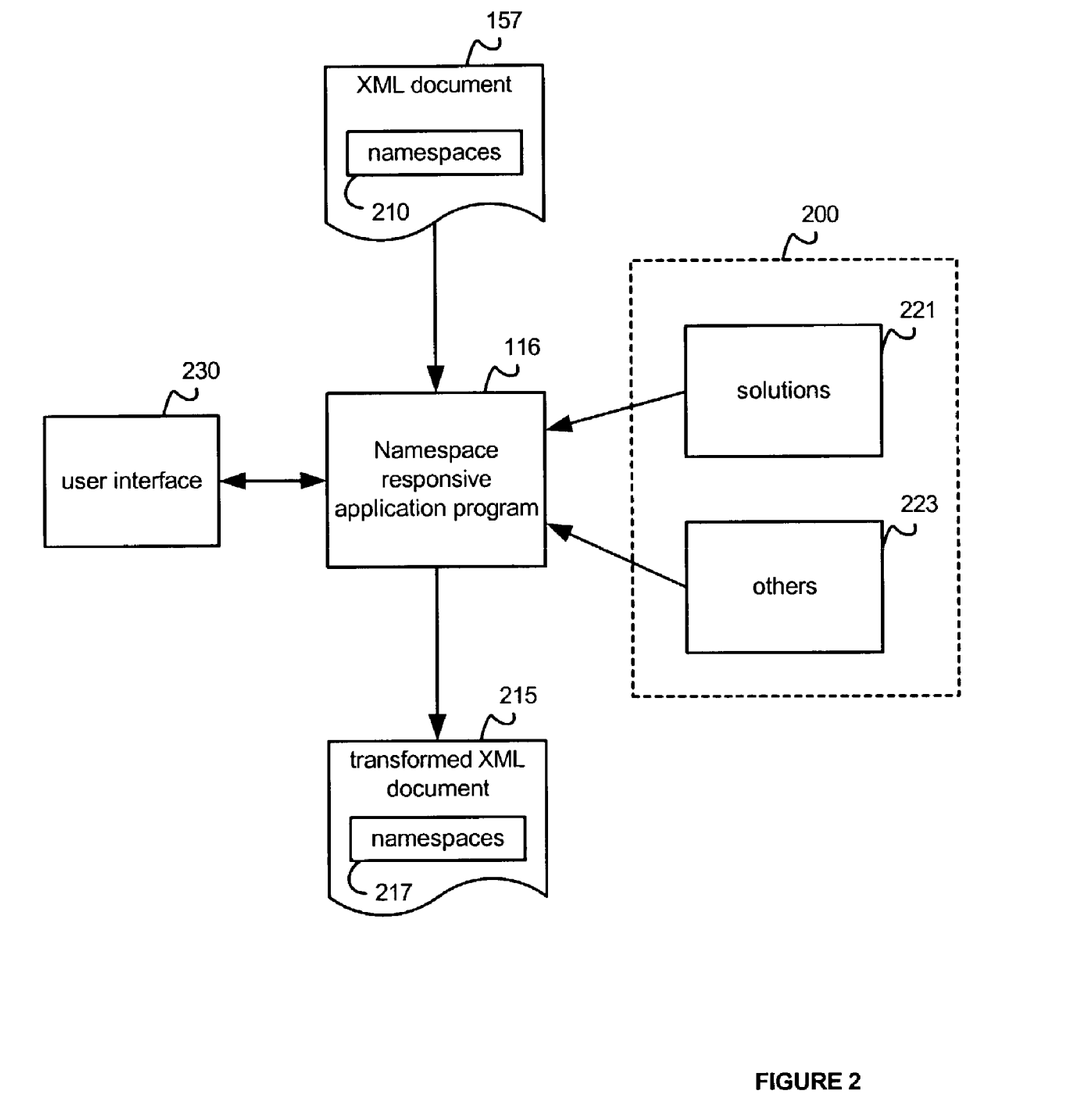
FIG. 2 illustrates a general overview of the invention implemented within the computing environment shown in FIG. 1.

FIG. 2 illustrates a general overview of the invention implemented within the computing environment shown in FIG. 1. Illustrated is a namespace responsive application program 116 after being commanded to open an XML document 157. XML document 157 may include one or more namespaces 210. The namespaces 210 may uniquely identify XML document 157 and may also identify solutions 221 and other information 223 that are applicable to XML document 157.

User interface 230 is a computer/user interface that allows users to interact with namespace responsive application program 116. User interface 230 will be discussed in more detail in conjunction with FIGS. 3 and 4. Briefly stated, user interface 230 enables a user to select a document for opening. If the document is an XML document, user interface 230 may further enable the user to select a solution to apply to the XML document as well as other options.

Transformed document 215 is a converted version of XML document 157 after at least one of the solution 221 has been applied to it. Transformed document 215 may be another XML document or a document in another format that the namespace responsive application can handle. Transformed document 215 may contain rich formatting that allows namespace responsive application program 116 to present the document to a user in a more user-friendly or meaningful fashion. Transformed document 215 may include namespaces 217 that are associated with namespace responsive application program 116, in addition to namespaces 210 in the original XML document 157.

Namespace responsive application program 116 is configured to open XML document 157 and to determine namespaces 210 from XML document 157. Namespace responsive application program 116 is also configured to query a namespace library 150 (not shown) and retrieve namespace related information 220 associated with namespaces 210 and identified in the namespace library. As shown in the figure, namespace responsive application program 116 may retrieve solution 221 and other namespace related information 223.

Namespace responsive application program 116 uses the namespace related information 200 to handle XML document 157. For example, namespace responsive application program 116 may determine the structure and semantics of XML document 157 using one of the solutions 221 if it contains a schema. Namespace responsive application program 116 may also apply one of the solutions 221 if it contains a transform. The transform may be applied to XML document 157 to convert the document to transformed XML document 215.

Figure 3:
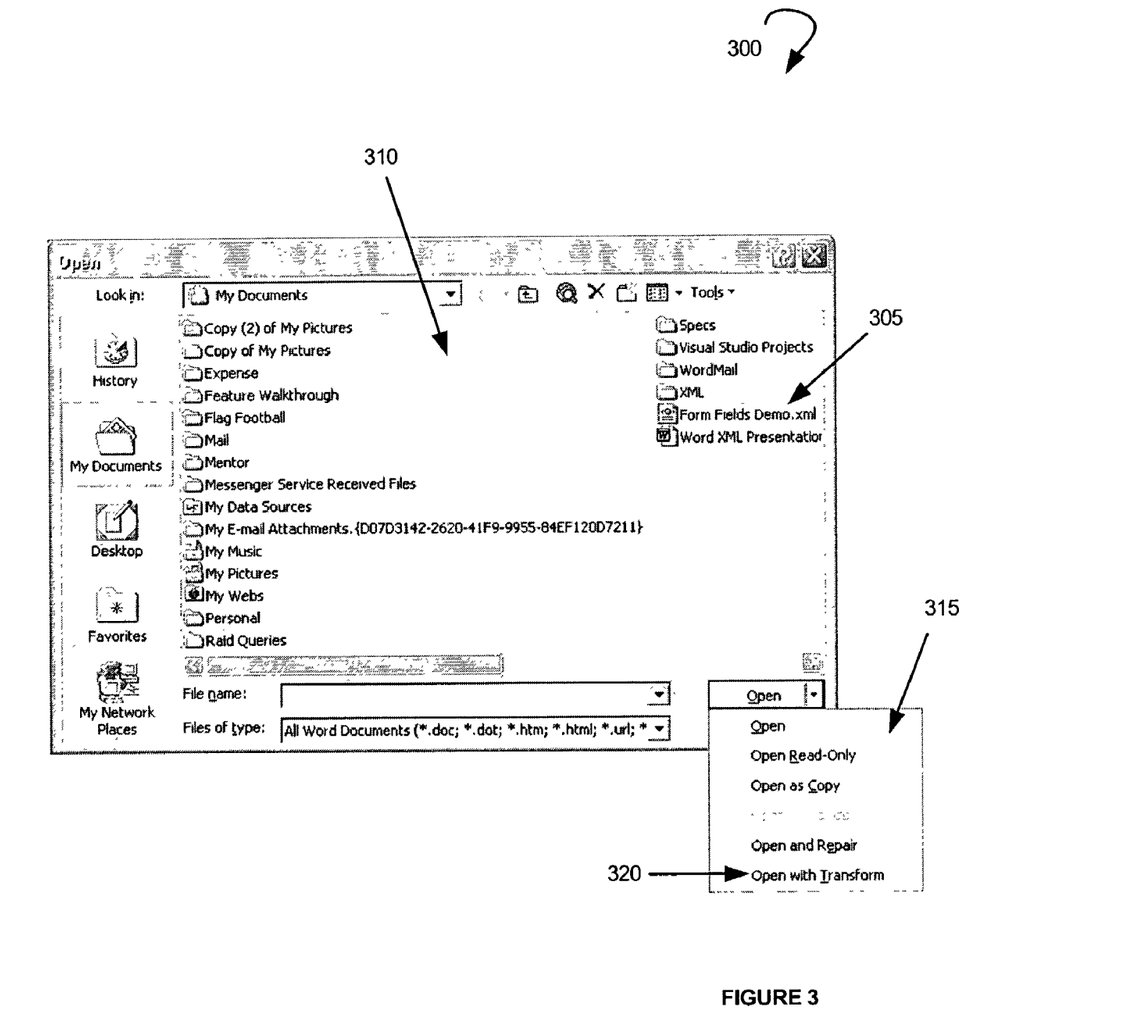
FIG. 3 is a screenshot of a document-opening dialog of an exemplary user interface associated with a namespace responsive application program.

FIG. 3 is a screenshot of a document-opening dialog 300 of an exemplary user interface associated with a namespace responsive application program. Document-opening dialog 300 enables a user to select a document for opening by the namespace responsive application program. As shown in the dialog, documents and directories of documents may be displayed in document display field 310.

As shown in this figure, XML document 305 has been selected. Because XML document 305 is an XML document, several opening options are available. A user may simply enter an automatic opening command (e.g. by double-clicking) to open the selected document using default opening options. Alternatively, the open options are presented in opening options selection field 315. One of the opening options is an "Open with Transform" option 320. The selection of this option 320 triggers a command for the namespace responsive application program to open and convert XML document 305 using a solution that includes a transform. If more options associated with opening XML document 305 using the solution are available, another dialog may be used to offer those options to the user for selection. In particular, if more than one solution is available to XML document 305, an option-selection dialog may be used to display a list of solutions to the user for selection. The option-selection dialog will be discussed in more detail in FIG. 4.

Figure 4:
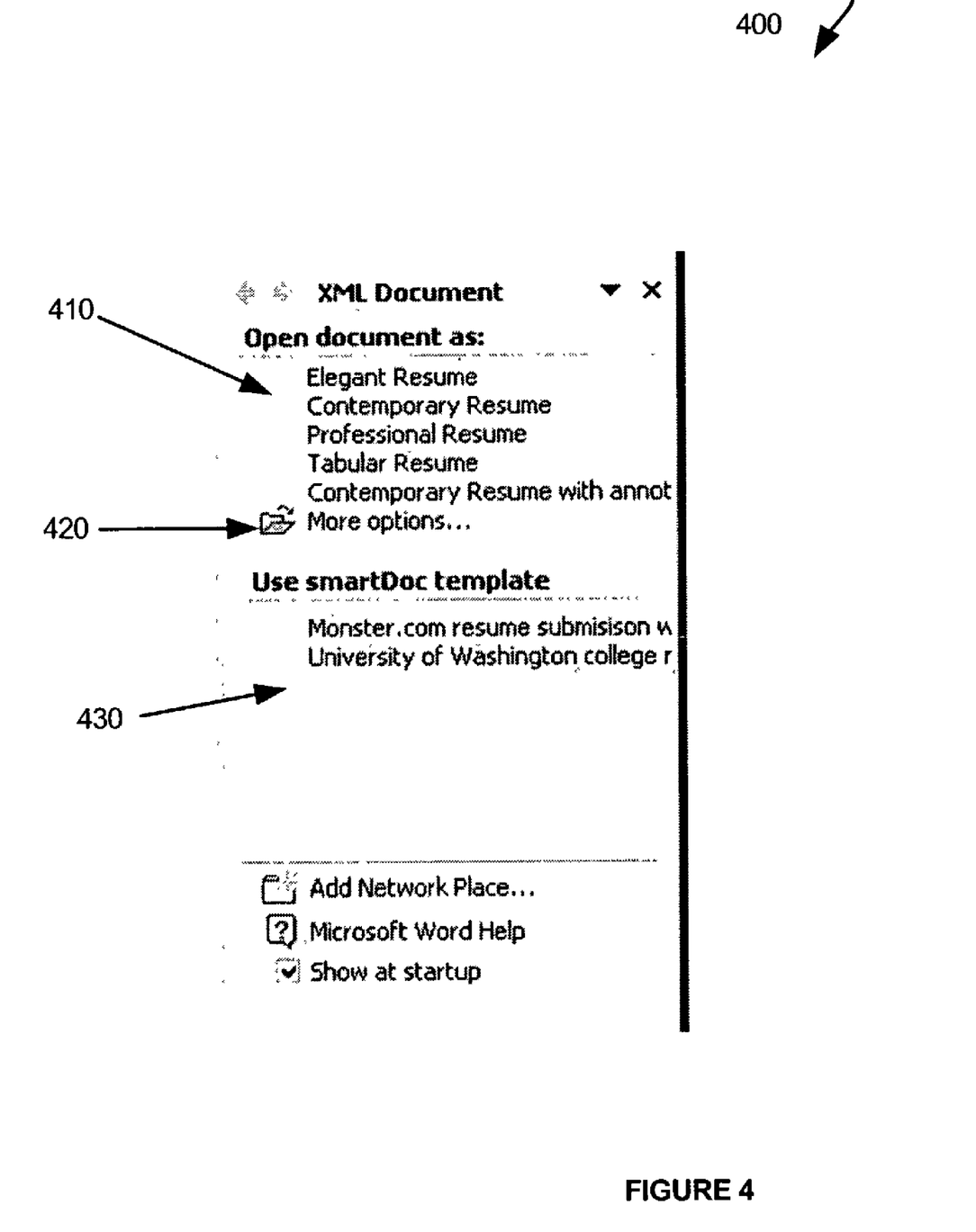
FIG. 4 is a screenshot of an exemplary option-selection dialog.

FIG. 4 is a screenshot of an exemplary option-selection dialog 400 that may be presented in response to selecting the "Open with Transform" option 320. Option-selection dialog 400 may present solutions to a user for selection. The solutions that are applicable to an XML document to be opened are presented to the user in a solution-selection field 410. Option-selection dialog 400 may present the solutions using their associated aliases. Aliases are common names that may be used to present namespace related information, such as solutions, in a more user-friendly fashion. As indicated by the aliases, the solutions that are displayed in option-selection dialog 400 are designed to convert the XML document into different resume formats.

A user may select one of the listed solutions for applying to the XML document and may select to see more options 420 available for opening the XML document. Option-selection dialog 400 may also present additional features, offered as part of the solutions, in the additional-feature-selection field 430. These additional features enhance the utilities of the XML document. An example of such additional features is a utility that automatically submits the XML document to a particular Internet address, after the XML document has been converted to a resume format using a solution in option-selection dialog 400.

Figure 5:
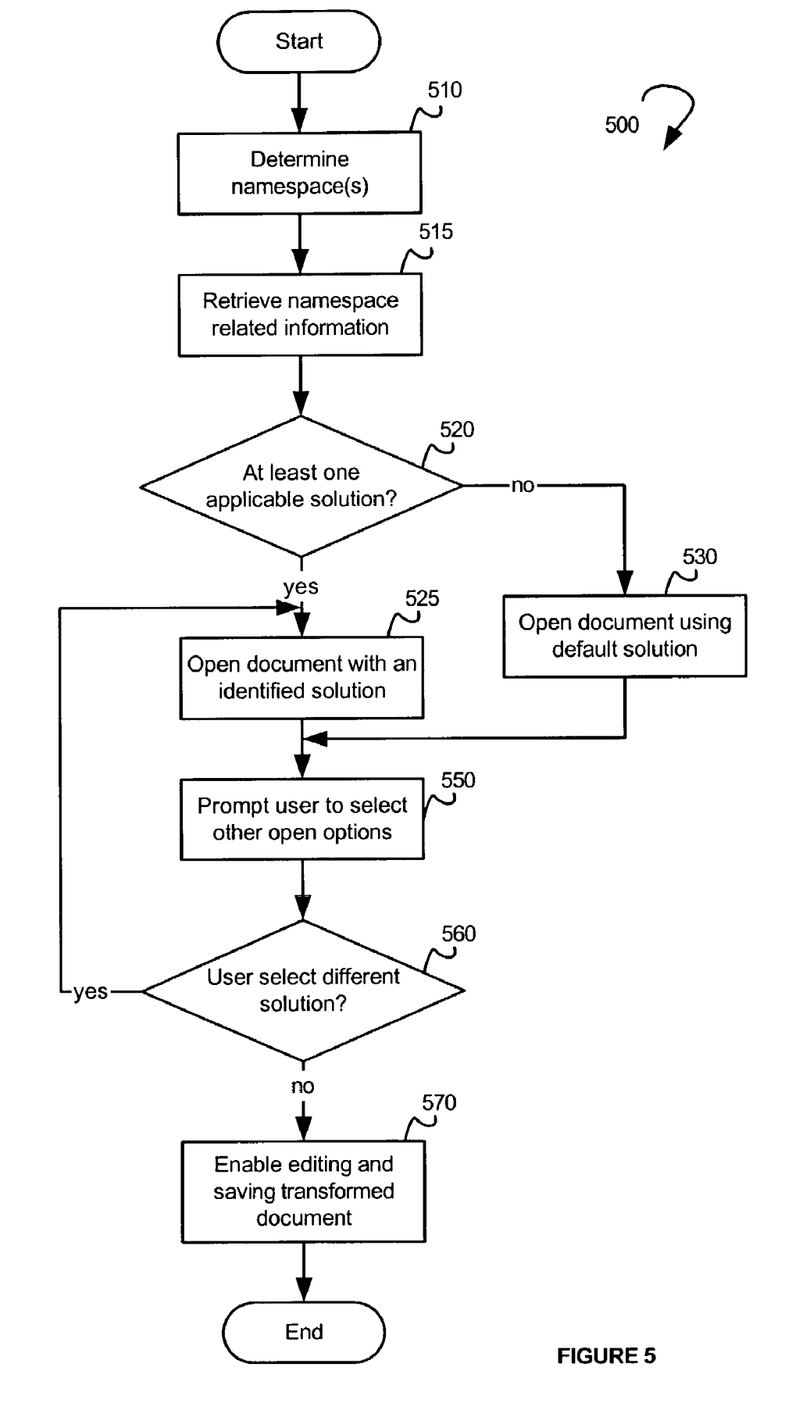
FIG. 5 is an operational flow diagram illustrating a process that may be used by a namespace responsive application program to open an XML document.

FIG. 5 is an operational flow diagram illustrating a process that may be used by a namespace responsive application program to open an XML document. Process 500 starts when the namespace responsive application program receives a command to open an XML document. The command may be received through a user-interface of the namespace responsive application program or through a general document-opening dialog of an operating system.

Moving from a start block, process 500 goes to block 510 where one or more namespaces associated with the XML document are determined. At block 515, namespace related information associated the namespaces determined in block 510 are retrieved from a namespace library.

At decision block 520, a determination is made whether at least one applicable solution is identified in the namespace related information. If at least one applicable solution is identified, process 500 continues at block 525 where the XML document is opened with the identified solution. If more than one solution is identified, the solution indicated as the preferred solution may be used. Process 500 then continues at block 550.

Returning to decision block 520, if no applicable solution is identified, process 500 continues at block 530 where the XML document is opened using a default solution. The default solution may be a universal solution that the namespace responsive application program uses to transform all XML documents that have no associated solution. The process then also continues at block 550.

At block 550, the user is prompted to select other options associated with opening the XML document. These other options are available from namespace related information retrieved at block 515. For example, option selection dialog 400 (FIG. 4) may be presented to prompt the user with any available options. The options may include alternative solutions if other solutions exist that are applicable to the XML document.

At decision block 560, a determination is made whether the user has selected a different solution with which to open the XML document. If so, the process loops back to block 525 and performs again as described above. If not, at block 570, the XML responsive program may enable the user to edit the transformed document or, if commanded by the user, save the transformed document.

The above specification, examples and data provide a complete description of the invention. Since many embodiments of the invention can be made without departing from the spirit and scope of the invention, the invention resides in the claims hereinafter appended.

What is claim is:

1. A computer-readable storage medium encoded with computer-executable components, comprising:
   receiving an XML document having a namespace,
   querying a database of solutions with the namespace of the XML document to obtain solution options indexed in the database of solutions by the namespace of the XML document, wherein the query of the database of solutions with the namespace of the XML document causes the identified solution options to be returned to an application program;
   when a selection of the XML document within an open document dialog is received, causing the application program to apply a default solution to open the XML document;
   when a selection of a transform selector within an open document dialog is received, displaying a list of rich formatting solution options received from the query of the database of solutions;
   receiving a selection of at least one of the rich formatting solution options;
   retrieving the rich formatting solution identified by the selected solution option from the database of solutions, wherein the rich formatting solution includes at least one feature for enhancing utility of the XML document; and
   causing the application program to obtain the rich formatting solution from the database and to apply the rich formatting solution to open the XML document in the rich format,
   wherein if the obtained rich formatting solution includes at least one XML schema, causing the application program to use information contained in the XML schema to handle the XML document,
   wherein if the obtained rich formatting solution includes at least one transform, causing the application program to apply the transform to convert the XML document to a format that the application program can handle and saving the transformed XML document.

2. The computer-readable storage medium of claim 1, wherein the plurality of solutions indexed by namespaces in the database include a pointer for retrieving a solution option.

3. The computer-readable storage medium of claim 1, wherein the transform is an Extensible Style Language (XSL) transform.

4. The computer-readable storage medium of claim 1, wherein the solutions include at least two solutions, and wherein the application program is configured to present the solutions to a user for selection.

5. The computer-readable storage medium of claim 1, wherein the application program is further configured to insert at least one namespace associating the XML document to the application program.

6. The computer-readable storage medium of claim 1, wherein the solution options are contained in a database, and wherein the application program is configured to retrieve the solution options contained in the database through a network.

7. A computer-implemented method for opening an XML document, comprising:
   receiving an XML document having a namespace,
   querying a database of solutions with the namespace of the XML document to obtain solution options indexed in the database of solutions by the namespace of the XML document, wherein the query of the database of solutions with the namespace of the XML document causes the identified solution options to be returned to an application program;

when a selection of the XML document within an open document dialog is received, causing the application program to apply a default solution to open the XML document;

when a selection of a transform selector within an open document dialog is received, displaying a list of rich formatting solution options received from the query of the database of solutions;

receiving a selection of at least one of the rich formatting solution options;

retrieving the rich formatting solution identified by the selected solution option from the database of solutions, wherein the rich formatting solution includes at least one feature for enhancing utility of the XML document; and causing the application program to obtain the rich formatting solution from the database and to apply the rich formatting solution to open the XML document in the rich format, wherein if the obtained rich formatting solution includes at least one XML schema, causing the application program to use information contained in the XML schema to handle the XML document, wherein if the obtained rich formatting solution includes at least one transform, causing the application program to apply the transform to convert the XML document to a format that the application program can handle and saving the transformed XML document.

8. In a computer system having a graphical user interface including a display and a user interface selection device, a method for providing and selecting documents for opening by an application program, comprising:

receiving an XML document having a namespace, querying a database of solutions with the namespace of the XML document to obtain solution options indexed in the database of solutions by the namespace of the XML document, wherein the query of the database of solutions with the namespace of the XML document causes the identified solution options to be returned to an application program;

when a selection of the XML document within an open document dialog is received, causing the application program to apply a default solution to open the XML document;

when a selection of a transform selector within an open document dialog is received, displaying a list of rich formatting solution options received from the query of the database of solutions;

receiving a selection of at least one of the rich formatting solution options;

retrieving the rich formatting solution identified by the selected solution option from the database of solutions, wherein the rich formatting solution includes at least one feature for enhancing utility of the XML document; and causing the application program to obtain the rich formatting solution from the database and to apply the rich formatting solution to open the XML document in the rich format, wherein if the obtained rich formatting solution includes at least one XML schema, causing the application program to use information contained in the XML schema to handle the XML document, wherein if the obtained rich formatting solution includes at least one transform, causing the application program to apply the transform to convert the XML document to a format that the application program can handle and saving the transformed XML document.

9. The computer-implemented method of claim 8, further comprising:

presenting identifiers corresponding to the rich formatting solutions, the rich formatting solutions being associated with the selected XML document; and receiving a selection of at least one of the rich formatting solutions.

10. The computer-implemented method of claim 9, wherein at least one of the rich formatting solution identifiers is an alias associated with the rich formatting solution.

11. The computer-implemented method of claim 9, further comprising:

presenting additional document-opening options for selection, the document opening options being associated with the selected XML document; and receiving a selection of at least one of the document-opening options.

12. The computer-implemented method of claim 9, further comprising presenting an identifier corresponding to the at least one feature associated with the rich formatting solution for selection by the user.

13. The computer-implemented method of claim 12, wherein at least one of the feature identifiers is an alias associated with the feature.

* * * * *